S. MOORE.
MACHINE BRAKE.
APPLICATION FILED NOV. 13, 1909.
967,809.
Patented Aug. 16, 1910.
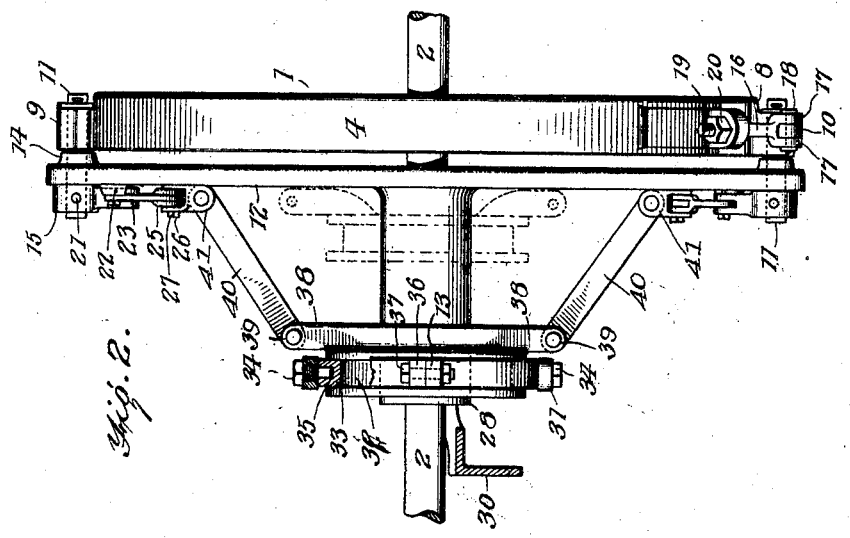
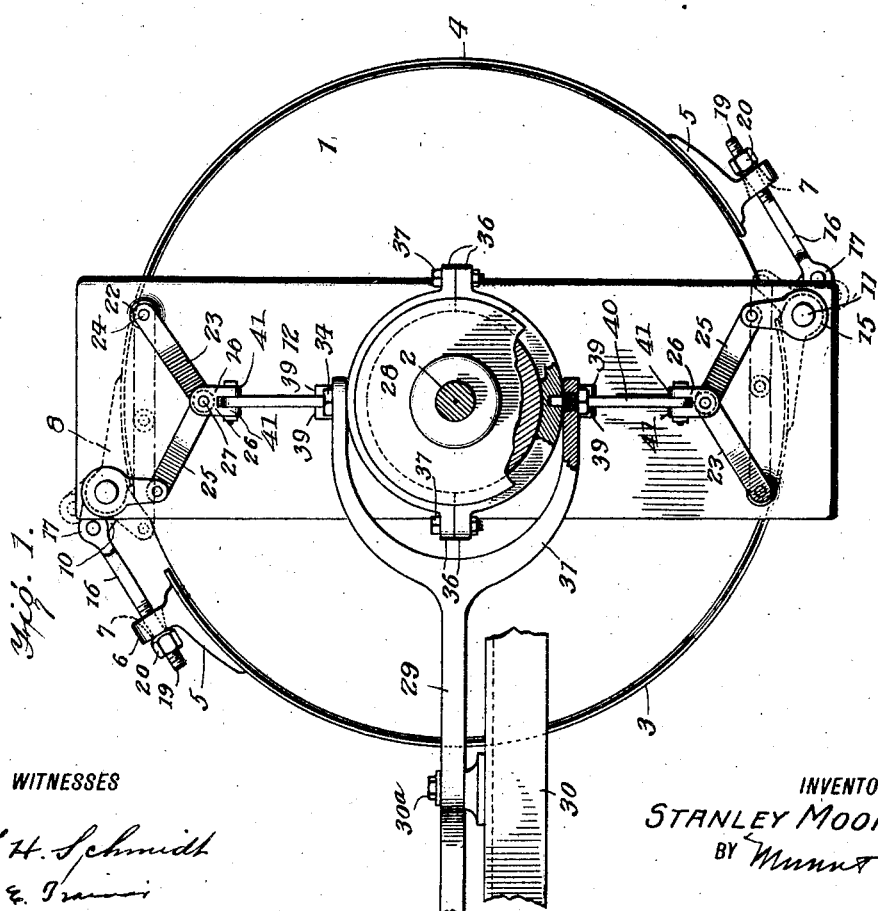
WITNESSES
L. H. Schmidt
O. E. Tr—
INVENTOR
STANLEY MOORE,
BY Munn & Co.
ATTORNEYS
THE NORRIS PETERS CO., WASHINGTON, D. C.

UNITED STATES PATENT OFFICE.

STANLEY MOORE, OF MONTICELLO, INDIANA.

MACHINE-BRAKE.

967,809.   Specification of Letters Patent.   Patented Aug. 16, 1910.

Application filed November 13, 1909. Serial No. 527,846.

*To all whom it may concern:*

Be it known that I, STANLEY MOORE, a citizen of the United States, and a resident of Monticello, in the county of White and State of Indiana, have made certain new and useful Improvements in Machine-Brakes, of which the following is a specification.

My invention is an improvement in machine brakes and consists in certain novel constructions and combinations of parts, hereinafter described and claimed.

The object of the invention is to provide a brake of the character specified, which will be especially adapted for traction engines, dredges, steam shovels, and the like, where a powerful, quick acting, self locking and quick releasing brake is desired.

Referring to the drawings forming a part hereof, Figure 1 is a side view of the improvement, and Fig. 2 is an end view.

In the embodiment of the invention shown in the drawings, the friction wheel 1, on the engine shaft 2, is provided with a sectional brake band consisting of similar sections 3 and 4, and one end of each section is provided with a bracket 5 having a lug 6 substantially radial to the shaft, and provided with an opening 7 therethrough.

The opening 7, as indicated by dotted lines in Fig. 1, is frusto-conical in shape, and is arranged with its larger end toward the adjacent end of the other section of the band. The said end is provided with a bracket 8, having a lug 9 substantially radial to the shaft and transversely perforated, and a stub shaft 11 is journaled on the lug.

A plate or fixed support 12 is arranged transversely of the wheel, and is provided with a hub 13, which is journaled on the shaft 2. The ends of the plate extend beyond the periphery of the wheel, and each end is provided with a perforated boss 14, through which the shaft 11 extends.

The shaft 11 is provided with a radial arm 10, and a rod 16 is provided at one end with a pair of spaced ears 17, between which the arm is received, and the ears and arm are traversed by a pivot pin 18. The opposite end of the rod is threaded as at 19, and extends through the opening 7. On the opposite side of the lug 6 the rod is engaged by a nut 20, and by turning the nut, the sections of the band may be adjusted with respect to the periphery of the wheel.

On the opposite side of the plate 12, from the wheel the shaft 11 is provided with a crank 15, which is secured to the shaft by a pin 21. The plate is provided with a bearing 22 at the opposite edge from the boss 14, and a link 23 is pivoted in the bearing by a pin 24. A second link 25 is pivoted to the crank arm 15, and the outer ends of both links are pivoted together and to the body portion of a yoke 26, by a pin 27.

It will be evident that the links 23 and 25 form a toggle, and that when the yoke 26 is moved toward the shaft 2, the shaft 11 will be oscillated in a direction to loosen the band, while when the yoke is moved in the opposite direction, as indicated by dotted lines in Fig. 1, the shaft will be oscillated to draw the adjacent ends of the band sections together, and tighten the band on the wheel.

The connection between the ends of the sections is the same at both ends, and as the sections are similar, the yokes 26 will be at diametrically opposite points as shown in Fig. 1. A sleeve 28 is slidable on the stub 13 of the plate, by means of a lever 29, pivoted as at 30ª to a fixed part 30 of the frame, and the end of the lever adjacent to the sleeve is provided with a fork 31.

The periphery of the sleeve is grooved as shown at 32, and in the grooves are arranged arm shaped blocks 33, and set screws 34 are threaded through the arms of the fork, and engage openings 35 in the blocks. The blocks 33 are semicircular, and the ends thereof are provided with radial lugs 36, and the corresponding lugs of the blocks are secured together by bolts 37. The blocks form a sectional collar slidable in the groove of the sleeve.

The sleeve 28 is provided with diametrically opposite lugs 38, each of which is provided at its outer end with spaced ears 39, and one end of a link 40 is pivoted between each pair of ears, the opposite end being pivoted between the arms 41 of the yoke 26 before mentioned.

It will be evident that when the lever 29 is swung, the sleeve 28 will be moved toward or from the plate 12, and the yokes will be moved radially of the shaft, whereby to tighten or loosen the band sections as previously described. By properly adjusting the nut 20, the grip of the sections of the wheel may be varied.

It will be understood that it is the straightening of the toggle that applies the brake, and when the said toggle is straightened, the brake is locked, and needs no other holding means. The links of the toggle being in alinement, they must be moved out of alinement before the natural resiliency of the band can act to release the brake. As soon as the links are moved out of alinement, the brake automatically releases.

It will be evident that the improved brake mechanism is very powerful, is self locking, and that when the lock is released the brake is also self releasing. The sections of the bands are preferably provided on their inner faces with a layer of material having a high coefficient of friction, as wood fiber.

I claim:

A device of the character specified, comprising in combination with the engine shaft, a friction wheel thereon, a brake band composed of similar sections encircling the wheel, each of said sections having at each end a bracket, one of the brackets having a perforated lug, a stub shaft rotatable in the other bracket, a fixed support arranged transversely of the wheel and in which each of the stub shafts is journaled, each of said shafts being provided with a plurality of radial arms, a bolt connected with one of the arms and extending through the perforated lug of the other section, a nut on the bolt, a toggle lever pivoted at one end to the fixed support and at the other to the other radial arm on the stub shaft, a collar slidable laterally on the shaft, means for moving the collar, and a connection between the collar and the toggle levers for simultaneously straightening and braking the same.

STANLEY MOORE.

Witnesses:
ALFRED W. REYNOLDS,
ADDISON K. SILLS, Jr.